(12) United States Patent
Willis

(10) Patent No.: US 6,288,317 B1
(45) Date of Patent: Sep. 11, 2001

(54) REAL TIME TRANSMISSION OF KEYBOARD MUSICAL PERFORMANCE

(76) Inventor: Raymon A. Willis, 304 Woodbine Rd., Savannah, GA (US) 31410

( * ) Notice: Subject to any disclaimer, the term of this patent is extended or adjusted under 35 U.S.C. 154(b) by 0 days.

(21) Appl. No.: 09/315,831

(22) Filed: May 21, 1999

Related U.S. Application Data

(60) Provisional application No. 60/087,348, filed on May 29, 1998.

(51) Int. Cl.[7] .......................... G09B 15/04; G10H 1/053; G10H 1/26
(52) U.S. Cl. .................. 84/600; 84/609; 84/626; 84/645; 84/478
(58) Field of Search .............. 84/600–602, 645, 84/477 R, 478, 453, 609–614, 626–633

(56) References Cited

U.S. PATENT DOCUMENTS

| | | | |
|---|---|---|---|
| 5,005,459 | * | 4/1991 | Adachi et al. ...................... 84/478 X |
| 5,464,946 | * | 11/1995 | Lewis .................................. 84/645 X |
| 5,637,822 | * | 6/1997 | Utsumi et al. ......................... 84/645 |
| 5,744,740 | * | 4/1998 | Mizuno .............................. 84/645 X |
| 5,774,672 | * | 6/1998 | Funahashi et al. ................ 84/645 X |
| 5,827,989 | * | 10/1998 | Fay et al. .............................. 84/645 |
| 6,069,310 | * | 5/2000 | James ................................... 84/645 |

* cited by examiner

Primary Examiner—Stanley J. Witkowski
(74) Attorney, Agent, or Firm—Jim Zegeer

(57) ABSTRACT

Keyboard musical performances are converted to MIDI signals which are coupled to a plurality of remote venues where the music is recreated in a plurality of live real time performances.

3 Claims, 1 Drawing Sheet

REAL TIME TRANSMISSION OF KEYBOARD MUSICAL PERFORMANCE

REFERENCE TO RELATED APPLICATION

This invention is the subject of provisional application Ser. No. 60/087,348 entitled REAL TIME TRANSMISSION OF KEYBOARD MUSICAL PERFORMANCE filed May 29, 1998.

The present invention is concerned with the real time transmission of keyboard music performances performed by a musician at one venue or location to one or more remote venues. For example, a performance by a noted pianist can be recreated at a plurality of remote sites or venues in real time and presented to the audience at the different venues as if they were at the actual performance.

The accurate and precise sensing of a musical keyboard actuation and MIDI thereof is disclosed in my U.S. Pat. Nos. 5,440,072, 5,459,282 and in my pending application Ser. No. 08/679,926 which issued as U.S. Pat. No. 5,763,806 on Jun. 9, 1998. In those prior patents and pending application, I disclose a system for effectively transforming the musician's fingers and finger actuation of keyboards into electrical signals in a cost-effective and expeditious way.

In accordance with the present invention, midified signals from a keyboard equipped with key actuation sensors (which sense key actuation and key actuation expression effects) is coupled to a modem which, in turn, couples the signals via transmission medium (telephone, including wires, fiber, satellites, etc.) to a remote venue or site where the MIDI signals are coupled to a sequencer used to reproduce the identical piano performance by the musician at remote sites, respectively, in real time with the original piano performance by the pianist or musician. Thus, the basic objective of the invention is to cause the performance of a keyboard musician at one location or venue to be reproduced in real time at one or more remote sites or venues. At the same time, video cameras may be trained on the musician to convey live images to the sites of the remote venues for visual presentation. This, it will be recognized, is in direct contrast to video performances which are video transmitted because, in those performances, the actual sound is converted to a soundtrack with the video and transmitted. In the present case, only the images are transmitted and the actual reproduction or musical sound is produced live at the remote site or venue as if they were at the site where the performance was actually created by the musician.

DESCRIPTION OF THE DRAWINGS

The above and other objects, advantages and features of the invention will become more apparent when considered with the following specification and attached drawing wherein.

DETAILED DESCRIPTION OF THE INVENTION

Figure 1:
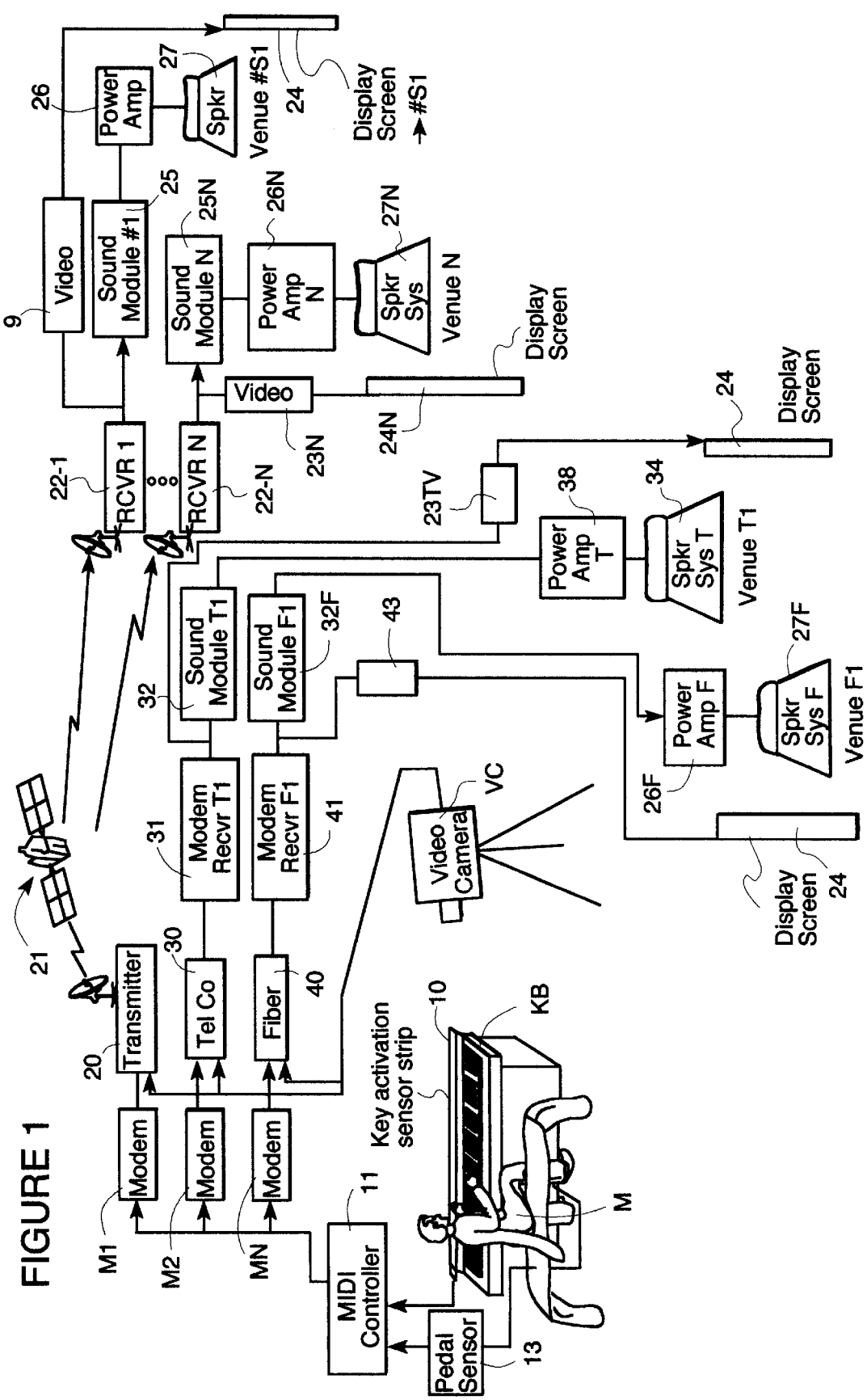
FIG. 1 is a functional block diagram of a system for the real time transmission of a keyboard musical performance simultaneously to a plurality of venues for recreation of the musical performance of these venues.

Referring to the drawing, a musician M is shown seated at a keyboard KB having key actuation sensor strips 10 (which may be of the type disclosed in my above referenced patents) for sensing key actuation and expression affects provided by the musician to a MIDI controller 11. Also, pedal sensors 13 are coupled to the MIDI controller 11 to provide the MIDI controller 11 with the pedal actuation signals. MIDI signals are provided by the MIDI controller to one or more modems M1, M2, M3 . . . MN. A video camera VC provides video signals of the visual performance to modems M1, M2 . . . MN so that there is provided to the modems for relay to distant venue points a compilation of electrical signals comprised of video pictures or images of the musician providing the performance and output from MIDI controllers to the modem. Thus, instead of a microphone picking up the sounds and, thereby inevitably providing some distortion, the digital equivalent of the musician's actual performance in the form of digital signals from the MIDI controller are provided to the modems for transmission to the performance venue just as if the musician was physically present at the remote revenue. In the first channel, the modems supplies the combined MIDI controller signals and the video images to a transmitter 20 which broadcasts either directly or via satellite 21 for relaying to receivers 22-1, 22-2 . . . 22-N. Each receiver has a video channel 9 which receives and converts video images to a visual representation on display screen DS of the musician providing the performance. In parallel and synchronism therewith, the sound module 25 converts the received MIDI controller signals from the MIDI controller 11 to electrical signals corresponding to the musician's actuation of each key in synchronism with the visual images provided on the screen which are amplified in power amplifier 26 and applied to speaker 27 so that the audience in venues No. 1 . . . N will hear the actual performance with the sounds created via the modification of signals by the key actuation sensor strips and MIDI controller.

In the second receiver channel 22-N, an identical video 23-N, and display screen 24-N are provided in a venue N which has a corresponding sound module 25-N, power amplifier 26-N and speaker 27-N, so that in several different venues, although images are reproduced from a video camera, the sound presented to the audience at that given venue will hear sounds created exactly as provided by the live musician.

In the second medium, the signals from the modem are conveyed via telephone company signals 30 via a modem receiver 31 and sound module 32 which drives a power amplifier 33 and speaker 34. A video receiver 23TV converts the video images for display on a display screen 24. In like manner, the modem M-N provides signals to a fiber optic channel 40 which couples them to a modem receiver 41 which has a sound module 42 and a video receiver 43. Video receiver 43 drives the display screen at fiber optic venue F1 and the sound module 32F drives the power amplifier 26F which in turn drives a speaker 27F. Thus, a plurality of different venues may be serviced from a single performance by way of radio transmission, telephone lines or by fiber optic communications, and at all of the performances, substantially simultaneous rendition of the live performance will be rendered with the sound or audio portion of the program material being generated live from MIDI signals at a host or plurality of different venues.

While the preferred embodiment of the invention has been shown, illustrated and described, it will be appreciated that other embodiments, adaptations and variations of the invention will be readily apparent to those skilled in the art.

What is claimed is:

1. A method of providing real time transmission of keyboard musical performances, comprising, providing a musician with a music keyboard equipped with key actuation sensors which sense the musical key actuation and key actuation expression effects, and a transmission modem, sensing the musical key actuation and key expression effects and providing MIDI signals corresponding thereto, coupling the MIDI signals to a plurality of remote venues by said transmission modem and at the remote venues providing a real time recreation of the music created by the musician by converting the MIDI signals corresponding to musical key actuation and expression effects to sound and wherein a video camera takes video images of the musician creating the keyboard musical performance and transmitting the video images in synchronism with said MIDI signals to each said remote venue and recreating a visual image of the musician providing the performance in synchronism with the playing of said music performance via said MIDI signals at each of said remote venues, respectively.

2. A system of providing real time performance and transmission of keyboard musical performances, comprising a music keyboard equipped with key actuation sensors which sense the key actuation and key actuation expression effects and providing MIDI signals corresponding thereto, a transmission system for coupling the MIDI signals to a plurality of remote venues, performance recreating means at the remote venues for providing a real time recreation of the music created by the musician by converting the MIDI signals corresponding to key actuation and expression effects to sound corresponding to said musical performance and including a video camera for taking video images of the musician creating the performance and transmitting the video images in synchronism with said MIDI signals to each said remote venue and said performance module includes a display screen at each remote venue for recreating a visual image of the musician providing the performance in synchronism with the converting of said MIDI signals to sound.

3. A method of creating real time of keyboard musical performances at a plurality of different venues comprising providing a musician with a keyboard equipped with key actuation sensors which sense the key actuation and key actuation expression effects of a musical performance by the musician, and providing a transmission system including one or more satellite, telephone or fiber communication circuits, sensing the key actuation and key expression effects and providing MIDI signals corresponding thereto, coupling the MIDI signals to a plurality of remote venues by said transmission system and at the remote venues providing a real time recreation of the musical performance created by the musician by converting the MIDI signals corresponding to key actuation and expression effects to sound corresponding to said musical performance, taking video images of the musician creating the keyboard musical performance and transmitting said video images in synchronism with said MIDI signals to each said remote venue and at each remote venue recreating a visual image of the musician providing the performance in synchronism with the recreation of said music performance via said MIDI signals at each of said remote venues, respectively.

\* \* \* \* \*